United States Patent [19]

Campbell

[11] 3,876,591

[45] Apr. 8, 1975

[54] ARYLENE SULFIDE POLYMERS

[75] Inventor: Robert W. Campbell, Bartlesville, Okla.

[73] Assignee: Phillips Petroleum Company, Bartlesville, Okla.

[22] Filed: Nov. 19, 1973

[21] Appl. No.: 416,777

[52] U.S. Cl. .................................. 260/79.1; 260/79
[51] Int. Cl. ........................................... C08g 23/00
[58] Field of Search .............................. 260/79, 79.1

[56] References Cited
UNITED STATES PATENTS 3,354,129  11/1971  Edmonds, Jr. et al. ............. 260/79.1
3,538,166  11/1970  Campbell et al. ................ 260/609 E Primary Examiner—Melvyn I. Marquis

[57] ABSTRACT

A method of producing an arylene sulfide polymer of relatively high molecular weight employing (1) polyhalo-substituted aromatic compounds; (2) organic amides; and, (3) an alkali metal bisulfide in an amount within the range of from about 0.8 to about 1.5 gram-moles per gram-mole of polyhalosubstituted aromatic compound.

12 Claims, No Drawings

ARYLENE SULFIDE POLYMERS

This invention pertains to the production of arylene sulfide polymers.

In one of its more specific aspects, this invention pertains to a novel method of producing polymers of that type produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of producing arylene sulfide polymers.

In accordance with one embodiment of the present invention, arylene sulfide polymers having preferred properties in respect to higher molecular weights are produced by reacting at least one polyhalo-substituted aromatic compound with a mixture in which at least one alkali metal bisulfide is contacted with at least one organic amide, the alkali metal bisulfide being employed in an amount within the range of from about 0.8 to about 1.5 gram-moles per gram-mole of polyhalo-substituted aromatic compound. The use of the alkali metal bisulfide in an amount within this specified range, as contrasted with its use in an amount outside this range, results in the production of an arylene sulfide polymer of higher, more desirable molecular weight, as evidenced by its higher inherent viscosity and higher crystalline melting point. The polyhalo-substituted aromatic compounds which can be employed in the method of this invention are compounds wherein the halogen atoms are attached to aromatic ring carbon atoms. Suitable compounds include 1,2-dichlorobenzene, 1,3-dichlorobenzene, 1,4-dichlorobenzene and the other polyhalo-substituted aromatic compounds described and exemplified in the aforementioned U.S. Pat. No. 3,354,129. Mixtures of polyhalo-substituted aromatic compounds such as dihalobenzenes can be used, for example, a mixture comprising at least one m-dihalobenzene and at least one p-dihalobenzene.

Alkali metal bisulfides which can be used in the process of this invention include lithium bisulfide, sodium bisulfide, potassium bisulfide, rubidium bisulfide, cesium bisulfide, and mixtures thereof.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like and mixtures thereof.

The components used in the preparation of the arylene sulfide polymer can be introduced into contact in any order. Water which can be present in any composite formed from any of the preceding compounds, for example, the composite formed from the polyhalo-substituted aromatic compound, the bisulfide and the organic amide or which can be present in a composite formed from the bisulfide and the organic amide can be removed, for example, by distillation, prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the alkali metal bisulfide and the organic amide is maintained at polymerization conditions to produce the arylene sulfide polymer.

The amount of organic amide employed can vary over a wide range but will generally be within the range of from about 100 grams to about 2500 grams per gram-mole of polyhalo-substituted aromatic compound employed.

The temperature at which the polymerization can be conducted can vary over a wide range and will generally be within the range of from about 125° C. to about 450° C. and preferably within the range of from about 175° C. to about 350° C. The reaction time will be within the range of from about 10 minutes to about 3 days and preferably from about 1 hour to about 8 hours. The pressure need be only sufficient to maintain the polyhalo-substituted aromatic compound and the organic amide substantially in the liquid phase and to retain the sulfur source therein.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480° C. in the presence of a free oxygen-containing gas, to provide cured products having high thermal stability and good chemical resistance. They are useful in the production of coatings, films, molded objects and fibers.

It is within the scope of the invention to bring the polyhalo-substituted aromatic compound, the bisulfide and the organic amide into contact in any order.

Also, it is within the scope of this invention to remove water from any combination of the aforesaid compounds.

The previous statements are based upon the following runs which illustrate the effect of the alkali metal bisulfide-polyhalo-substituted aromatic compound molar ratio on the quality of the arylene sulfide polymer produced. The runs clearly indicate that a ratio within the range of from about 0.8 to about 1.5 gram-moles of the alkali metal bisulfide per gram-mole of polyhalo-substituted aromatic compound gives the highest quality polymer in terms of inherent viscosity and crystalline melting point. Use of 0.5 gram-mole of alkali metal bilsulfide per gram-mole of polyhalo-substituted aromatic compound gives a somewhat higher polymer yield. However, the inherent viscosity and the crystalline melting point clearly indicate that the polymer is of lower molecular weight than that of polymer produced in accordance with the process of this invention. The examples follow.

EXAMPLES

In the following Examples values shown for polymermelt temperature (PMT) were determined by placing the polymer sample on a heated bar with a temperature gradient. Values for crystalline melting point (Tm) were determined by differential thermal analysis. Values for inherent viscosity ($\mu_{Inh}$.) were determined at 206° C. in 1-chloronaphthalene at a polymer concentration of 0.4 g/100 ml solution.

EXAMPLE I

To a stirred 1 liter autoclave were charged 41.8 g (0.5 gram-mole, 67% assay) NaSH and 276.7 g. of N-methyl-2-pyrrolidone (NMP). Dehydration for 1 hour and 30 minutes by heating to 210° C. yielded 16 ml. of distillate containing 10.9 g of water. 1,4-Dichlorobenzene in an amount of 147.0 g (1 gram-mole) in 50 g of NMP was added to the residual mixture, and the resulting mixture was heated at 245° C. for 3 hours at 75 to 120 psig.

The product, a medium brown colored liquid, was washed 4 times in 1-liter portions of water, 2 times in 1-liter portions of methanol and 2 times in 1-liter portions of water. The poly(p-phenylene sulfide) product was dried in a vacuum oven at 45° C. The product had a PMT of 168° C.

EXAMPLE II

To a stirred 1 liter autoclave were charged 66.9 g (0.8 gram-mole, 67% assay) NaSH and 276.7 g of NMP. Dehydration for 1 hour and 20 minutes by heating to 208° C. yielded 20 ml. of distillate containing 16.9 g of water. 1,4-Dichlorobenzene in an amount of 147.0 g (1 gram-mole) in 50 g of NMP was added to the residual mixture, and the resulting mixture was heated at 245° C. for 3 hours at 70 to 150 psig.

The product, a dark brown liquid, was washed four times in 1-liter portions of water, five times in 1-liter portions of methanol and 2 times in 1-liter portions of water The poly(p-phenylene sulfide) product was dried in a vacuum oven at 45° C. The product had a PMT of 168° C.

EXAMPLE III

In substantially the manner employed in Examples I and II, poly(p-phenylene sulfide) was produced using 1.0 gram-mole of sodium bisulfide and 1.0 gram-mole of 1,4-dichlorobenzene, the amount of NMP being that employed in Examples I and II.

The product had a PMT of 179° C.

EXAMPLE IV

In substantially the same manner employed in the foregoing examples, poly(p-phenylene sulfide) was produced using 1.5 gram-moles of sodium bisulfide and 1.0 gram-mole of 1,4-dichlorobenzene, the amount of NMP being that employed in the previous examples.

The product had a PMT of 177° C.

The results of the above runs are summarized in the following Table which includes two runs conducted substantially as described in the preceding examples except for the use of the sodium bisulfide to 1,4-dichlorobenzene mole ratios of 0.98 to 1 (1.0 gram-mole sodium bisulfide and 1.02 gram-moles 1,4-dichlorobenzene) and 1.96 to 1 (2.0 gram-moles sodium bisulfide and 1.02 gram-moles 1,4-dichlorobenzene), respectively.

| Mole Ratio Sodium Bisulfide to 1,4-Dichlorobenzene | Poly(p-phenylene sulfide) | | |
|---|---|---|---|
| | Yield* % of Theoretical | Tm | $\mu$Inh. |
| 0.5 to 1 | 45 | 220 | 0.01 |
| 0.8 to 1 | 34 | 234 | 0.02 |
| 0.98 to 1** | 40 | 258 | 0.03 |
| 1 to 1 | 32 | 232 | 0.04 |
| 1.5 to 1 | 24 | 236 | 0.02 |
| 1.96 to 1** | 24 | 200 | <0.01 |

*Based on the ingredient present in the smaller amount in terms of moles.
**Earlier run with different thermocouple calibration.

The above tabulation indicates that the poly(p-phenylene sulfide) produced when the mole ratio of sodium bisulfide to 1,4-dichlorobenzene was about 0.8 to 1 to about 1.5 to 1 was desirably of higher molecular weight, as evidenced by the higher values for inherent viscosity and crystalline melting point, than was the polymer produced by using mole ratios of these reactants outside this range.

It will be evident from the foregoing that various modifications can be made to the method of this invention. Such are considered, however, to be within the scope thereof.

What is claimed is:

1. A method of producing a polymer which comprises:
   a. forming a composition by contacting at least one polyhalo-substituted aromatic compound wherein the halogen atoms are attached to aromatic ring carbon atoms, at least one organic amide and at least one alkali metal bisulfide, said bisulfide being employed in an amount within the range of from about 0.8 to about 1.5 gram-moles per gram-mole of polyhalo-substituted aromatic compound; and,
   b. maintaining at least a portion of said composition at polymerization conditions to produce said polymer.

2. The method of claim 1 in which said alkali metal bisulfide is selected from the group consisting of lithium bisulfide, sodium bisulfide, potassium bisulfide, rubidium bisulfide and cesium bisulfide.

3. The method of claim 1 in which said organic amide is selected from the group consisting of formamide, acetamide, N-methylformamide, N,N-dimethylformamide N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide and teramethylurea.

4. The method of claim 1 in which said polyhalo-substituted aromatic compound is selected from the group consisting of 1,2-dichlorobenzene, 1,3-dichlorobenzene and 1,4-dichlorobenzene.

5. The method of claim 1 in which said alkali metal bisulfide is sodium bisulfide, said organic amide is N-methyl-2-pyrrolidone and said polyhalo-substituted aromatic compound is 1,4-dichlorobenzene.

6. The method of claim 1 in which water is removed from said composition prior to maintaining said composition at polymerization conditions.

7. A method of producing a polymer which comprises:
   a. contacting at least one organic amide with at least one alkali metal bisulfide to form a first composition;

b. contacting at least a portion of said first composition with at least one polyhalo-substituted aromatic compound wherein the halogen atoms are attached to aromatic ring carbon atoms to form a second composition, said polyhalo-substituted aromatic compound being employed in an amount to provide an alkali metal bisulfide to polyhalo-substituted aromatic compound molar ratio within the rrange of from about 0.8 to 1 to about 1.5 to 1; and, c. maintaining said second composition at polymerization conditions to form said polymer.

8. The method of claim 7 in which said alkali metal bisulfide is selected from the group consisting of lithium bisulfide, sodium bisulfide, potassium bisulfide, rubidium bisulfide and cesium bisulfide.

9. The method of claim 7 in which said organic amide is selected from the group consisting of formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide and tetramethylurea.

10. The method of claim 7 in which said polyhalo-substituted aromatic compound is selected from the group consisting of 1,2-dichlorobenzene, 1,3-dichlorobenzene and 1,4-dichlorobenzene.

11. The method of claim 7 in which said alkali metal bisulfide is sodium bisulfide, said organic amide is N-methyl-2-pyrrolidone and said polyhalo-substituted aromatic compound is 1,4-dichlorobenzene.

12. The method of claim 7 in which water is removed from said first composition prior to maintaining said second composition at polymerization conditions.

* * * * *